United States Patent [19]
Stanton et al.

[11] Patent Number: 5,654,540
[45] Date of Patent: Aug. 5, 1997

[54] HIGH RESOLUTION REMOTE POSITION DETECTION USING SEGMENTED GRATINGS

[76] Inventors: Stuart Stanton, 83 Highland Ave., Bridgewater, N.J. 08807; Donald Lawrence White, 10 Forest Ct., Morris Plains, N.J. 07950; George Gustave Zipfel, Jr., 164 Canoe Brook Pkwy., Summit, N.J. 07901

[21] Appl. No.: 516,060

[22] Filed: Aug. 17, 1995

[51] Int. Cl.$^6$ .................................................. G01B 11/00
[52] U.S. Cl. .................... 250/237 G; 250/548; 356/401
[58] Field of Search .................... 250/237 G, 559.4, 250/559.44, 548; 356/354, 356, 355, 357, 358, 373, 374, 375, 395, 396, 397, 400, 401; 359/569, 572, 576

[56] References Cited

U.S. PATENT DOCUMENTS

| 5,521,995 | 5/1996 | Brazas ............................ 356/356 |
| 5,596,413 | 1/1997 | Stanton et al. ..................... 356/401 |

OTHER PUBLICATIONS

Sugimoto, D., et al., Optical/Laser Microlithography II, SPIE, vol. 1088, pp. 258–267 (1989).
*Photomicrography* A Comprehensive Treatise, vol. 2, John Wiley & Sons, Inc. pp. 527–540 (1970).
M. Francon, *Optical Interferometry*, Academic Press, pp. 87–89 (1966).
Steinmetz, C., et al., Interferometric Metrology, *SPIE*, vol. 816, pp. 79–94 (1987).
Saleh, B.E.A., et al., *Fundamentals of Photonics*, John Wiley and Sons, pp. 800–806.
Born, M., et al. *Principles of Optics*, The MacMillan Company, N.Y. pp. 401–404 (1964).

*Primary Examiner*—Edward P. Westin
*Assistant Examiner*—John R. Lee
*Attorney, Agent, or Firm*—G. S. Indig

[57] ABSTRACT

Remote positioning to submicron accuracy is based on comparison of two interference gratings, the first of constant phase, and the second segmented. Positioning corresponds with equal segment-by-segment overlap of an image of one grating superimposed on the other.

29 Claims, 9 Drawing Sheets

VIEW 5a

VIEW 5b

VIEW 8a      VIEW 8b

FIG. 11

VIEW 11a — 110, 111, 112

VIEW 11b — 113, -45° QUAD, 45° QUAD

VIEW 11c — 114

VIEW 11d — 115, 45° QUAD

HIGH RESOLUTION REMOTE POSITION DETECTION USING SEGMENTED GRATINGS

BACKGROUND OF THE INVENTION

1. Field of the Invention

Non-contacting position sensing.

2. Description of Related Art

Most advances in modern technology result from being able to make accurate measurements. State-of-the-art technology is capable of producing highly precise products only because it is capable of measuring dimensions and positions with great accuracy. The integrated circuit industry depends on making and superimposing submicron patterns with great precision. Computer controlled milling machines produce complicated and precisely shaped workpieces. Metrology, the technology of measurement, is the quality control that makes modern technology possible.

Some measurement tools require direct contact. Examples are calipers, strain gauges, atomic force microscopes, contact profilometers. Others operate without contact. Examples are capacitive gauges, microscopes, optical interferometers and telescopes.

In general a remote instrument cannot make as accurate a measurement as one close to an object. An exception is the interferometer, which can measure changes in position parallel to the interferometer beam to a fraction of a wavelength of light. However, interferometric measurement is suitable only for a special category of objects—those with optically perfect planar surfaces.

One approach to remote measurement compares markings—one on the target and another on a reference body. An interference grating is a useful marking. Its inherent redundancy makes for ready identification and reliable sensing. It has been recognized that grating comparison may be self registering. *SPIE*, Vol. 1088, pps. 258–267 (1989) describes a complex system entailing reflection and route retracing which compares a conventional grating with a segmented grating—a two-part grating with parts out of phase. Positioning is based on relative degree of overlap for the two segments. However, route retracing again requires perfect reflecting surfaces which are optically flat and clean.

There is a continuing need for a robust method for remote position sensing.

SUMMARY OF THE INVENTION

Remote position sensing, relatively independent of surface characteristics, uses the operating principle of dark field microscopy. See *Photomicrography*, vol. 2, John Wiley & Sons, Inc. pp. 527–540 (1970). As in the *SPIE* method, it compares reference and target gratings ("signal gratings") —one segmented and one unsegmented. An image of a first grating is superimposed on a second grating, and degree of overlap is compared for the two segments by measurement using reflected or transmitted beams. Unlike the *SPIE* method, it does not require beam rerouting via a reflection path—a further contribution to robust measurement.

Signal-to-noise ratio is improved by combining one or both of the signal gratings with carrier gratings which create diffracted beams for transmitting positioning information. Sensing, carried out without zeroth order beams—using first order or higher order diffracted beams, lessens noise due to imperfections on reflecting surfaces and in transmission paths. While a number of configurations is described, a useful combination takes the form of a signal grating with lines constituted of cross gratings of shorter period. The combined grating is most valuable in carrying the relatively-low intensity composite image produced by superimposition since signal strength is reduced by any interposed optical elements, and is accordingly more sensitive to imperfections on the target surface. It is usefully employed also in formation of the reference beam, where it further improves signal-to-noise ratio and may serve the further purpose of beam-routing.

A preferred embodiment, "time multiplexing", made possible by use of a combined reference grating, provides for sequential sensing of segment-related information on a single detector. In this embodiment, a single laser illumination source is modulated to produce beams of alternating angles of incidence on the reference mark. It permits use of the same detector for the segment-derived readings and avoids inaccuracies due to variations in separate detectors and beam paths.

Variants use the same principles but offer additional position information and/or accuracy. While all embodiments depend on comparison of paired segments, additional segments/gratings are sometimes used. Gratings made up of three or more segments maintain more uniform sensitivity over an entire period and facilitate extension to beyond a single period. Paired orthogonal marks are used for x-y information. An additional x- or y-mark may be used for $\theta$ (rotational) information. An additional grating mark of differing period, sensed in conjunction with a basic position mark, enables position sensing over distances greater than that of a single period. Interleaved marks of repeating segmented gratings average out illumination variations. In some embodiments, it is possible to measure z-direction. Other variants are discussed.

Terminology

Grating—Series of parallel lines and spaces, generally of constant period. As with usual interference gratings, line thicknesses and space widths are ordinarily the same.

Target—The article for which position is to be sensed. It may constitute a workpiece or a tool used in shaping the workpiece.

Reference Mark—A mark, printed or otherwise affixed on the reference, and comprising one or more reference gratings. It is ordinarily on a mask (or reticle), used for forming the projected image on the target.

Signal or Positioning Information—Information derived from reference grating(s) and/or target grating(s), generally contained in the low-period grating of either.

Reference Beam—Signal beam emanating from the reference mark and containing reference information for imaging.

Target Mark—A mark, printed or otherwise affixed on the target, and comprising one or more gratings.

Composite Beam—Beam(s) produced by illumination of the target mark either by transmission or by reflection. It is not required that the beam be focused or amenable to focusing.

Composite Field—Electric field produced by superimposition of the projected mark on the superimposed mark.

Segmented Mark—Interference grating constituted of two or more in-line gratings, of the same period, but with segments out of phase with each other (with segments spaced one from the other by a distance unequal to that establishing the period). Good engineering practice requires a phase mismatch of at least 10°. Either or both reference mark and target mark may be segmented.

Time-Multiplexing—By which comparison information corresponding with individual segments of a segmented mark is sampled sequentially (rather than simultaneously).

Carrier or Routing Information—Information contained in a mark serving the sole purpose of routing the emerging beam.

Collinear—Refers to two or more parallel beams—in context of the invention, contemplates overlapping, or even coincident, beams.

Alignment—Act of positioning the target relative to the reference.

Object—Constituting the pattern to be imaged by projection, e.g. a circuit pattern for VLSI fabrication.

Dead Reckoning—Positioning based solely on measured movement of object and/or target based on a previously measured position.

Them or θ—Measure of rotation in the x-y plane of the target relative to the reference.

BRIEF DESCRIPTION OF THE DRAWING

FIG. 11, in sequence, shows a reference mark grating, an aerial image of that grating, a target mark grating, and the target mark grating together with the superimposed aerial image.

DETAILED DESCRIPTION

Figure 1:
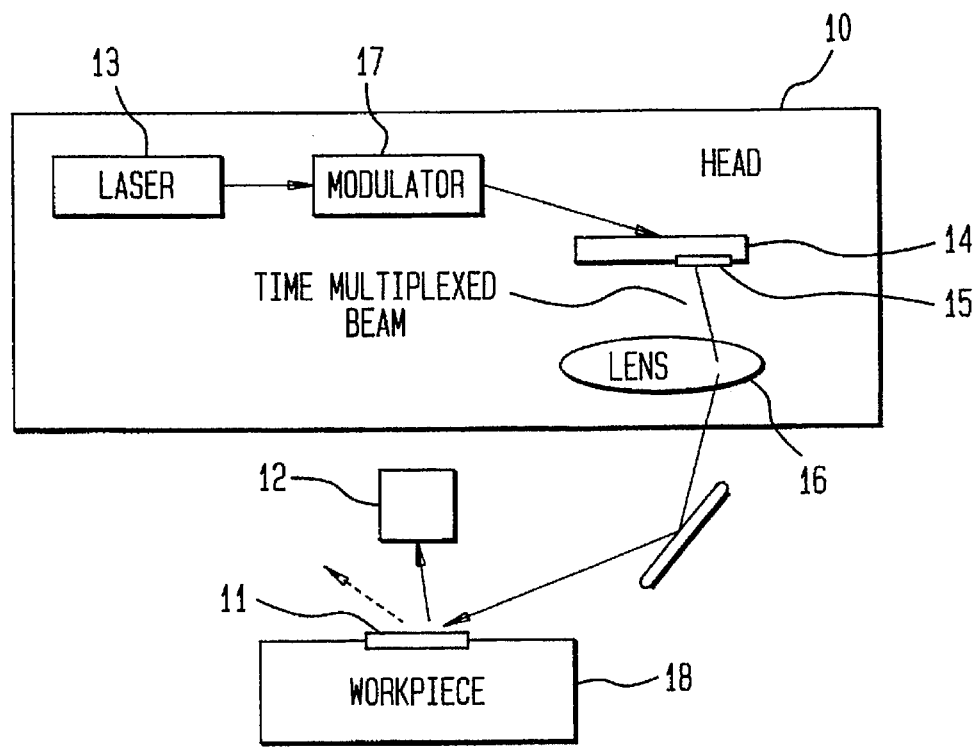
FIG. 1 depicts a position sensing operation using arrangement providing for time-multiplexing.

General—It is useful to compare the new method with interferometry. For a general description of the basic Michelson interferometer, see *Optical Interferometry*, M. Francon, Academic Press, 1966, with attention to pp. 87–89. For a discussion of its use in positioning, see *SPIE*, vol. 816, pp. 79–94 (1987). Both methods are non-contacting, both access with a light beam, both are capable of precision of a fraction of a wavelength of that light beam. Interferometry depends on reflection from an optically-perfect mirror surface which is precisely oriented relative to the accessing beam. An independent reference is used for alignment. The inventive method is also capable of subwavelength precision, uses an accessing light beam and aligns by comparison with a reference. It is, however, less demanding of surface perfection and orientation, and is self-registering.

Improvement is in part due to redundancy and other grating properties which facilitate detection of markings and permit noise reduction. By avoiding specular noise introduced by surface and path imperfections, dark field imaging improves sensitivity and accuracy. The principle will find use for a variety of purposes extending to more reliable reading of bar codes at check out counters and to reliable identification of moving vehicles—ambitions which have been impeded by surface films, dirt, and other imperfections.

The invention provides for flexibility in beam routing. In the usual embodiment, the reference and/or target gratings (the "signal gratings" or "primary gratings") are constituted of grating lines formed of cross gratings (the "carrier gratings" or "secondary gratings"). The "carrier" gratings contained in the reference and target marks, are independent of each other, so that reference and readout beam paths may be designed separately.

The two gratings making up a combined mark serve specialized, near-independent, purposes. As used in referencing, the carrier grating is inherently stripped from the superimposed image, and serves only for diffraction. The primary purpose of the signal grating is position sensing—however first-order satellite beams emerging from the target (with routing the combined result of diffraction from both carrier and signal gratings) contribute additional positioning information in advanced embodiments. The generally-preferred combined mark uses a relatively short carrier period, e.g. $P_c$=0.5 μm–5.0 μm, with results in large diffraction angles. This separates diffracted beam(s) from the zeroth order beam, and better accomplishes the prime function of dark-field imaging. Longer signal periods of the order of $P_s$=2 μm–50 μm as measured on the target, are sufficient for sensing to accuracy of microns or less. Alternative markings may be useful for some purposes. They include relatively short period signal gratings constituted of long period carrier gratings, as well as structures in which the secondary gratings serve for diffraction.

For best accuracy, segment-by-segment comparison is sequential (using time-multiplexing). This avoids equipment variations and uses the same beam paths for both readings. This is generally more important than the 50% reduction in integrated signal energy resulting in some forms of time-multiplexing.

Detailed discussion is largely of position sensing with paired collinear beams produced by illumination of a segmented reference mark. Additional paired beams produced by illumination of multiple marks average out intensity variations. Additional marks may be used for x-y sensing, for theta sensing, and for other purposes. Arrangements for determining height (z) or out-of-plane tilt are based on concurrent or sequential detection of satellite modes (with routing influenced by the signal grating).

Position adjustment, e.g. to attain a null difference reading for the segments, may be manual or automated, using any of various feedback arrangements.

Diffraction routing generally uses either or both first-order diffracted beams and satellites. (Third order and higher odd order beams, while of lesser intensity are also suitable for dark-field imaging.) The zeroth order reference beam may be blocked to increase contrast, or to halve the spatial periodicity of null readings.

Under some circumstances, position-sensitive gray scale may offer sufficient precision—and may be used instead of segment equalization.

Co-filed U.S. application Ser. No. 08/516,368, allowed Aug. 5, 1996 now U.S. Pat. No. 5,596,413 is directed to "through-the-lens" operations, for example in LSI fabrication and for display panel use. Various of the detailed position sensing procedures described in that application may be used here.

The System—Position sensing operations are described in conjunction with FIGS. 1-7.

FIG. 1 illustrates a position sensing operation. The operation requires a head 10, a target mark 11, a detector 12 and a computer, not shown. The head in the figure contains a dedicated laser 13, a reticle 14 carrying the reference mark 15 consisting of a segmented grating and a lens 16. A modulator 17 is included for one form of time-multiplexing—for sequentially directing the laser beam along alternative paths of different angles of incidence on the reference mark. The reference mark 15 is imaged on the target mark 11 carried by target 18, thereby generating a composite beam which is directed to photodetector 12. The resulting photocurrent is sent to and analyzed by a computer. Since position-sensing depends only on total power, it is not necessary to focus the beam so as to produce a composite image on the detector. There are, however, circumstances, where focusing is useful—e.g. where composite beam information is to be collected on a fiber or on other constrained area. As discussed in greater detail in FIG. 10, the two segments of the reference grating, while equally illuminated at all times, are of different carrier periods, permitting sequential sensing of the composite fields produced by the individual segments.

Figure 2:
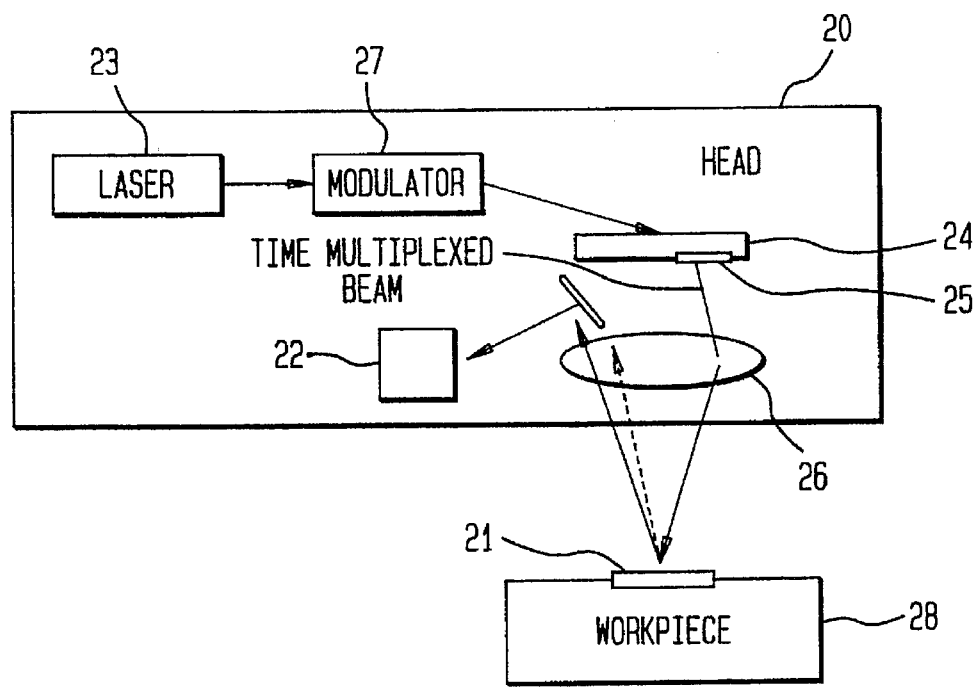
FIG. 2 shows such an operation with an alternative time multiplexing arrangement.

The arrangement of FIG. 2 is similar but redirects the composite beam emanating from the target mark 21, back through lens 26. Numbering of other elements uses the same final integers as in FIG. 1.

Figure 3:
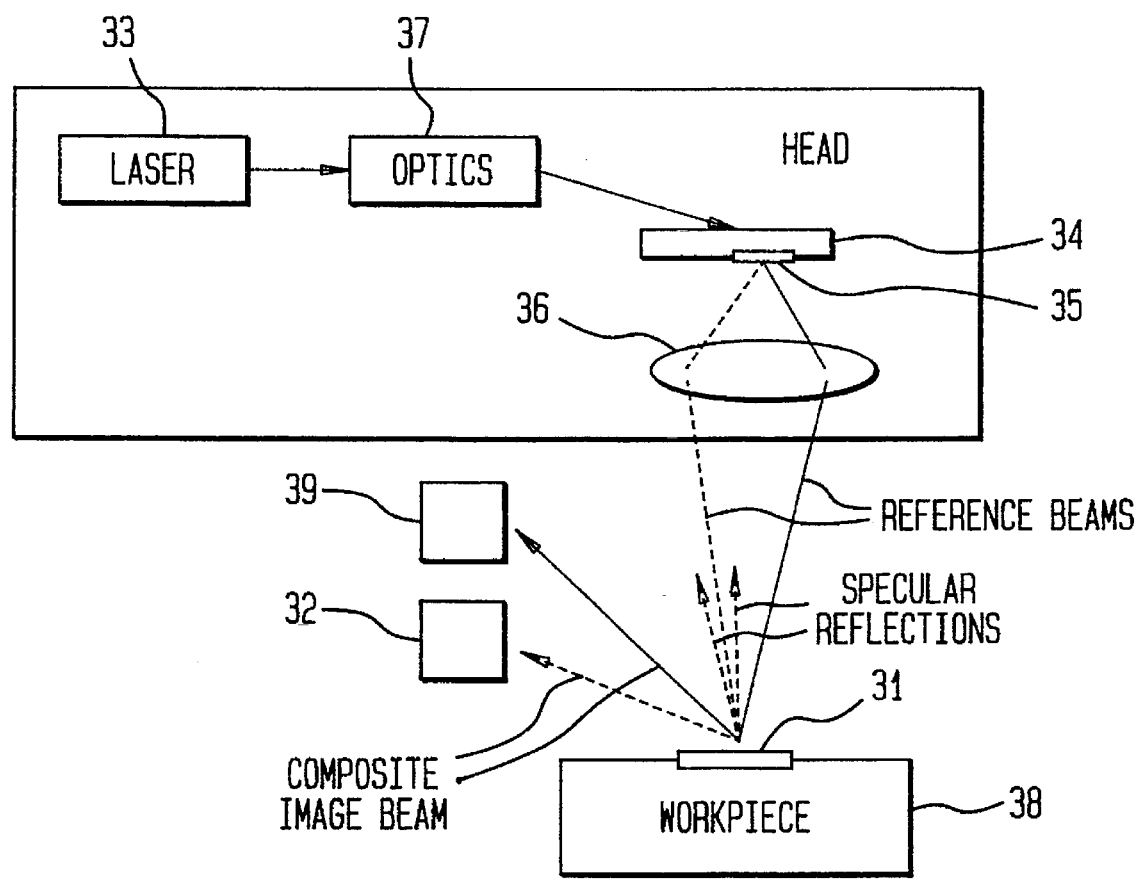
FIG. 3 shows a position sensing operation permitting simultaneous segment-by-segment comparison (in lieu of time-multiplexing).

The arrangement of FIG. 3 uses two photodetectors 32 and 39 for sensing individual segment-related composite image beams. It may be used for time-multiplexing, or for simultaneous sensing. Simultaneous sensing is less expensive than time-multiplexing, and is adequate for less demanding purposes. The FIG. 3 arrangement permits constant sensing of information from both segments at all times. Like time multiplexing, simultaneous sensing may be self-calibrated. However, the two sensed beams necessarily take different paths, likely with different diffraction efficiencies. Detectors, as in FIG. 3, and possibly other equipment is not shared. In consequence, there is some loss in accuracy. Spatial separation depends on the difference in angle of incidence of the two first-order diffracted reference beams at the target. Numbering strategy in FIG. 3, with numbers now in the third decade, the same as in FIG. 1.

A number of other arrangements are possible. One provides for time-multiplexing without need for carrier gratings, and with distinct paths resulting from reflection rather than diffraction. The laser beam is split into two beams that illuminate separate segments of the mark. Path routes are kept separate as exiting the target mark, and are finally made parallel at a single detector. Time multiplexing may be initially introduced at some position after that of the illuminating beam. Divergent beams may simultaneously focus on the target mark, and be separated in time for sequential comparison by the detector.

Figure 4:
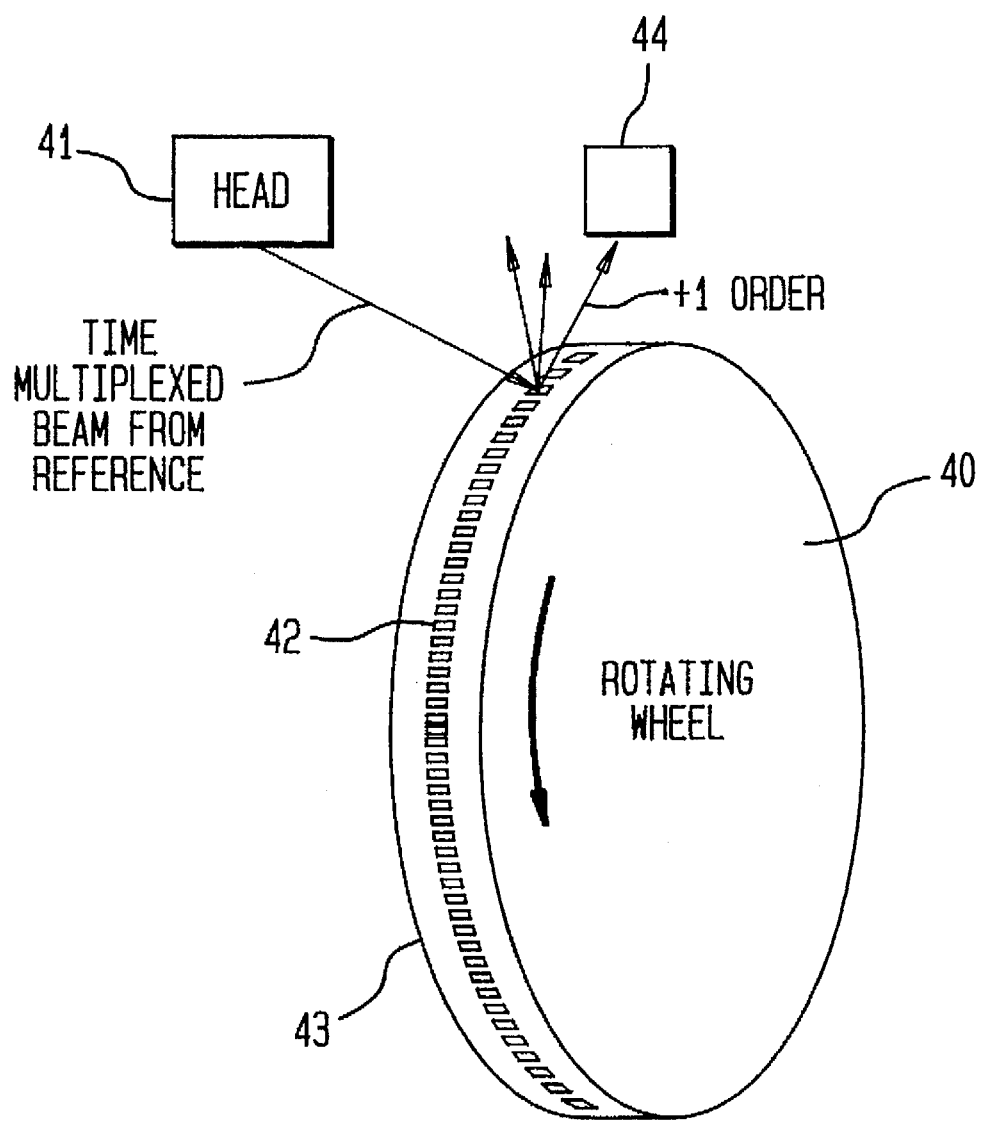
FIG. 4 shows a position sensing operation for monitoring rotation.

In FIG. 4 the system, while retaining positioning capability of the fundamental teaching, is used for monitoring motion—in this instance the rotational velocity of a rotating wheel such as capstan 40. A head 41, of the general design of head 10 of FIG. 1 is used for projecting an image of a reference mark on target marks 42. Target marks 42 constitute a continuous, constant-period grating over the entirety of the periphery 43 of the capstan. A photodetector 44 senses light intensity of the composite beam. Detection of a single first-order beam is sufficient for many embodiments.

Simultaneous detection of both first-order beams, (+1) and (−1), is possible using appropriate lens elements. Simultaneous detection may simply increase signal amplitude. Comparison of the two may yield z-position information since null readings for the two correspond only for correct positioning. Comparison may yield more detailed x- or y-position information. Blocking the zeroth order of the reference beams halves the period between null readings—offering increased precision.

Tracking position over more than one period, as in motion monitoring, is facilitated by use of the "three-phase" system, as later described. Such a system is based on a three-segment mark, e.g. with segments mismatched one from the other by 120° phase-shifts.

Figure 5:
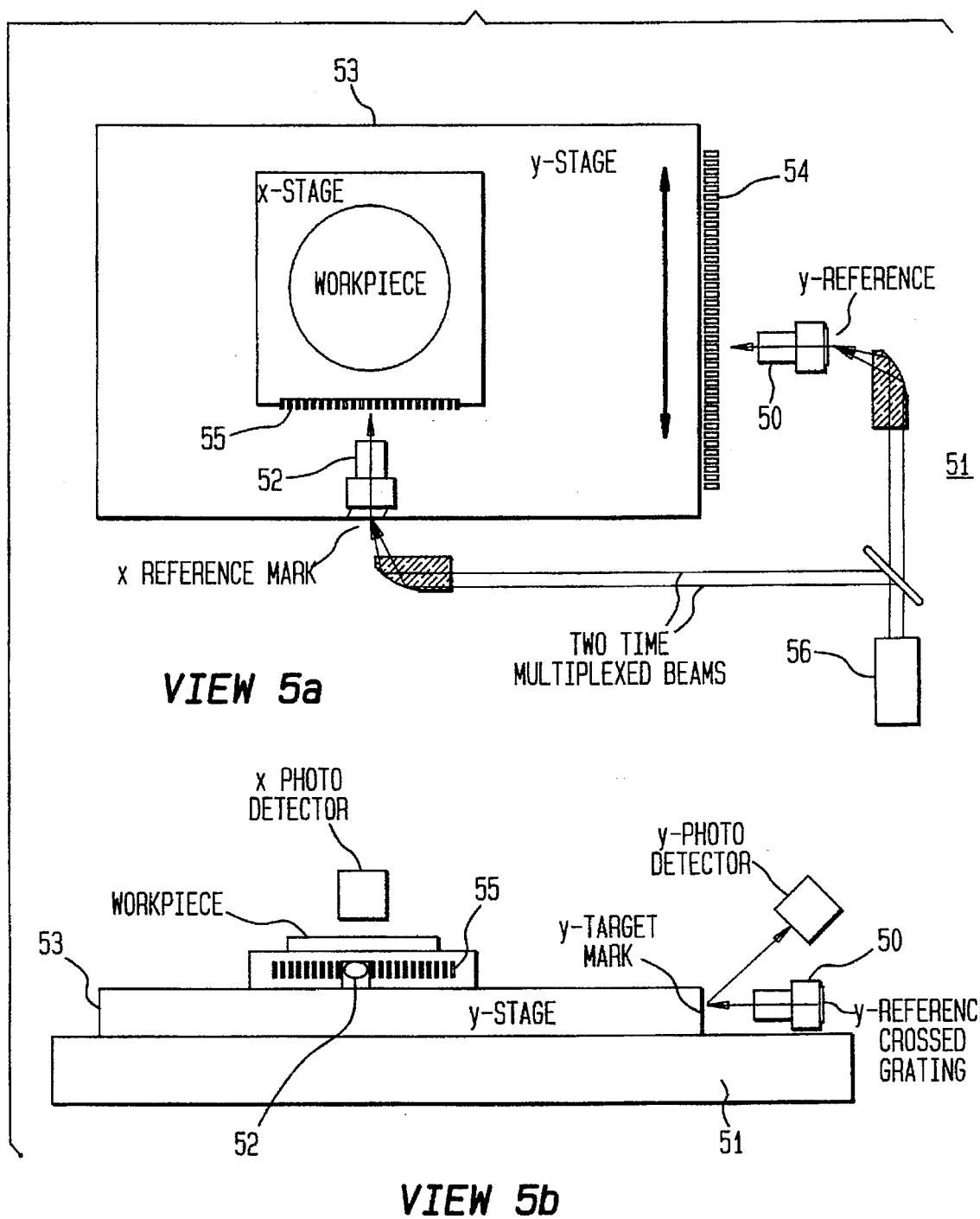
FIG. 5 shows an optical encoder for measuring translation of an x-y table.

FIG. 5 contains plan and front elevation views (VIEW 5a and VIEW 5b, respectively) of an arrangement for monitoring the position of an x-y stage. Here, y-lens 50 is mounted on base 51, while x-lens 52 is mounted on y-stage 53. In the arrangement shown, y-target grating 54 and x-target grating 55 are both at constant distance from their associated reference heads during measurement, minimizing need for refocusing. However, the depth of focus may be sufficient to accommodate distance variations for an alternative design in which both x- and y-heads are mounted on the base. The individual x- and y-sensing systems function as described in FIG. 1. For the design shown, a single laser-modulator 56 provides time multiplexed beams for both x- and y-position sensing.

Figure 6:
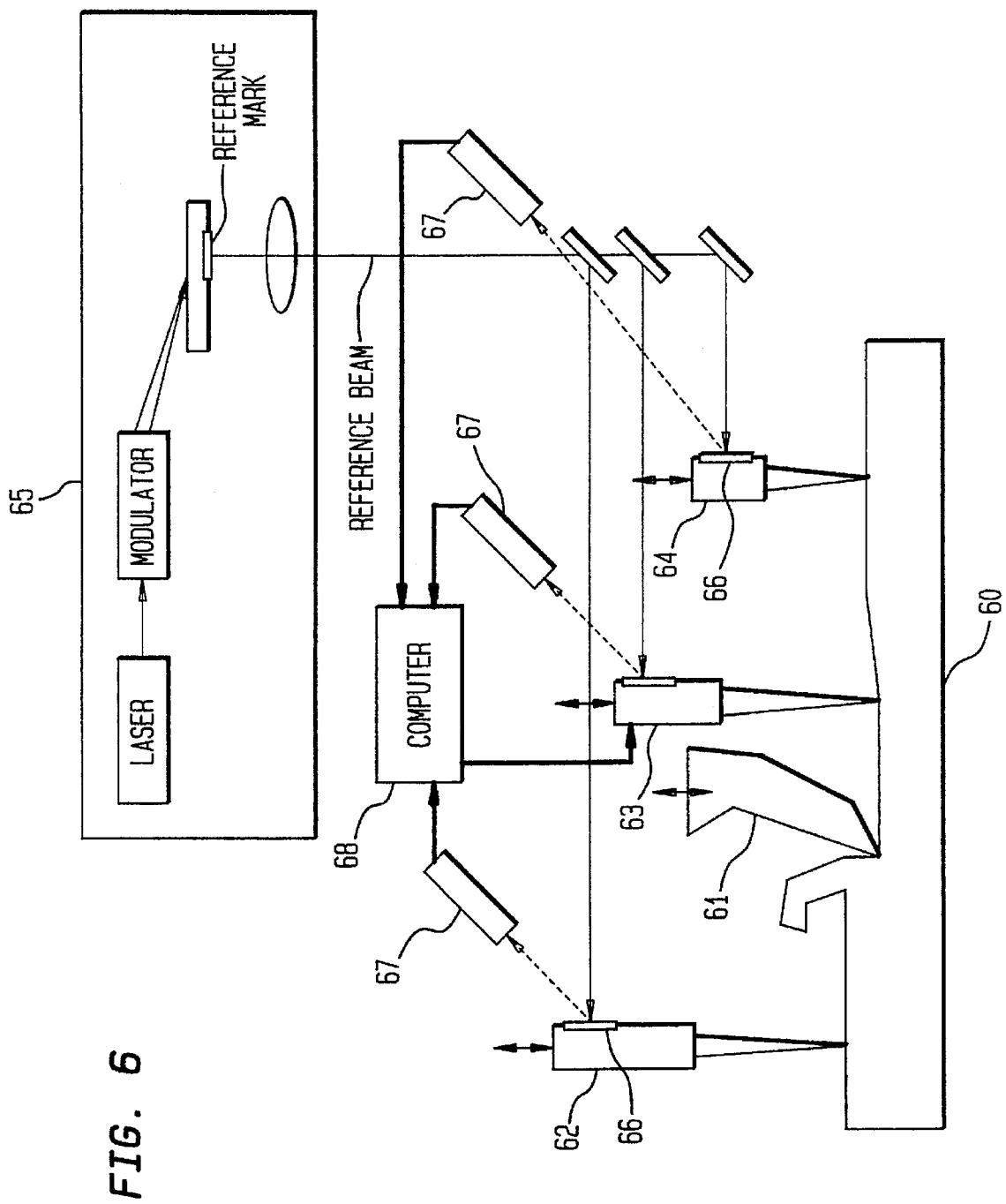
FIG. 6 shows a milling operation being monitored by use of the invention.

In FIG. 6, the system is used to monitor a machining operation in which workpiece 60 is being milled by computer-controlled cutting tool 61. Probes 62, 63 and 64, are spring-loaded and designed to follow vertical changes in surface during movement. Monitoring of the cutting operation requires only two probes, 62 and 63. Data yielded by probe 64 is a further precaution and corrects for any distortion in the workpiece due to the cutting tool. Accuracy benefits by use of a single reference head 65. The reference beam is split in to three separate beams for illuminating target marks 66, with sensing of composite fields by associated photodetectors 67, and with outputs delivered to computer 68. While depth of focus is likely sufficient to accommodate the three varying path lengths for the split reference beam as shown, they may be equalized by folding.

FIGS. 4–6 illustrate uses of the invention. Others exist. Vibratory motion, in operating machines or in stationary structures, may be studied by monitoring time variations in position information; in x- y- or z-position; with the target stationary or in motion.

Principle of Operation

Figure 7:
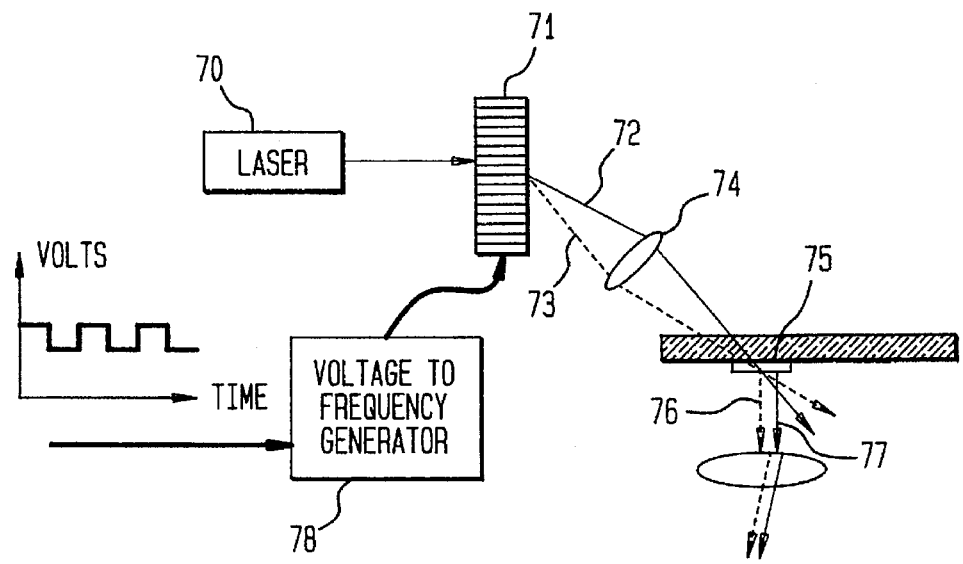
FIG. 7 shows a sensing operation provided with an acousto-optic deflector for time-multiplexing.
Figure 10:
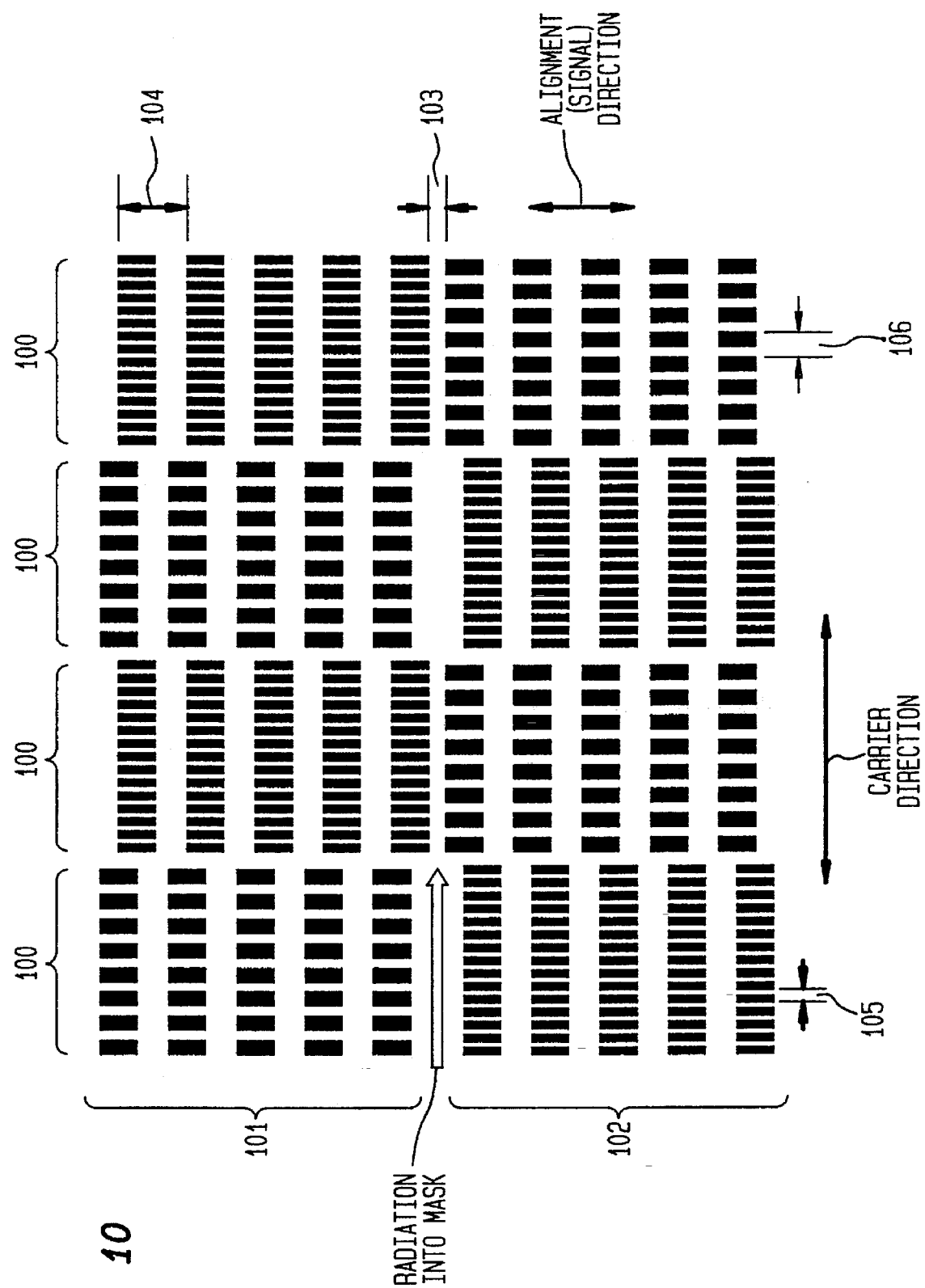
FIG. 10 shows a signal-carrier reference mark.

FIG. 7 illustrates a form of time-multiplexing. A laser beam emitted from laser 70 is incident on modulator 71—in this instance, an acousto-optic deflector—which produces alternating beams 72 and 73. The two beams are directed by lens 74 so that each illuminates both segments of segmented reference mark 75. In addition to zeroth order beams (transmitted extensions of beams 72 and 73) each is accompanied by two first-order diffraction beams. Reference mark segment lines are, themselves, short period "carrier" gratings, which, as discussed in description of FIG. 10, are of differing period. Large angle input beam 73 is diffracted by the shorter period carrier grating to produce diffracted beam 76. Beam 72, is diffracted a lesser amount by the longer period carrier grating, thereby resulting in beam 77 of the same emergency angle as beam 76. The collinear, time-multiplexed reference beams 76 and 77 are focused on the target. (Zeroth order and unused first order beams are discarded.)

Operation of an acousto-optic deflector is described in *Fundamentals of Photonics*, B. Saleh and M. C. Teich, John Wiley and Sons, pp. 800–806. The divergence angle between the two emerging beams is proportional to the acoustic frequency generated by a piezoelectric transducer in response to an incoming square-wave voltage.

The magnitude of the deflection is determined from the relationship:

$$\sin \phi_{out} = \sin \phi_{in} \pm \lambda f / v \qquad (1)$$

in which:

$\phi_{out}$=deflection angle $\phi_{in}$=input angle $\lambda$=the wavelength of the laser light f=frequency of the acoustic wave v=velocity of sound in the acousto-optic material.

The acoustic wave alternates between first and second frequencies $f_1$ and $f_2$, thereby producing two diffracted beams, which, by use of auxiliary optics, are steered and shaped to strike the reticle at angles of $\phi_{in+}$ and $\phi_{in-}$.

An acousto-optic reflector is a versatile instrument. It can be used to generate simultaneous beams by concurrent use of two or more modulating acoustic waves at differing frequency. The power of the generated beams may be varied in time, by modulating the acoustic wave amplitude.

FIGS. 8–11 relate operation to grating design. In description of these figures, and elsewhere in the disclosure, alignment illumination is considered to be coherent. A coherent beam has maximum depth of focus, high signal-to-noise ratio, and can be filtered precisely. There are circumstances, however, under which it is desirable to reduce the coherence of the laser light by use of diffusers or other optics, or to use an incoherent source, such as a mercury arc lamp. Partial incoherence averages perturbations in the beam path, caused by air turbulence or other non-uniformities between the reference mark and the target.

All of FIGS. 8–11 are illustrative of an embodiment in which reference and target marks both include carrier gratings. For the design shown, low period grating lines themselves consist of high frequency (or carrier) gratings. This form of the invention has been found convenient for routing, both for introducing and extracting information from the system, while at the same time generating collinear, time-multiplexed beams. The embodiment shown is preferred. Noise rejection is particularly critical at the target position, and the generic invariably provides for combined target markings. In general, routing is the primary function of the carrier grating, although specular reflection or refraction may supplement diffraction.

Gratings depicted are of the familiar form of a conventional interference grating—of nominally equal lines and spaces. In general, this is preferred, with any substantial deviation producing "dead spots"—regions in which detected intensity is insensitive to adjustment. There may, nevertheless, be circumstances where deviation serves a particular purpose.

Alignment grating periods may vary greatly, depending on the form of radiation and other conditions in use. With long working distances—long distances between the head and the target—it may be convenient to magnify the projected image, so that for electromagnetic radiation in the visible spectrum, $P_s$, as imaged on the target, may be from 20 to 200 μm (~10–100 wavelengths for radiation in the visible spectrum). In systems with small working distances, $P_s$ may be smaller—a few microns or less. For other forms of radiation—e.g. electromagnetic radiation in the microwave spectrum or acoustic waves—grating periods may continue to scale as wavelength, with periods of a few or several hundred wavelengths. Factors such as capture range influence choice of $P_s$. Carrier grating period, $P_c$, is chosen for yielding the desired path route and for creating collinear beams. Diffraction angle is determined by means of equations of the form of Eqs. 3 and 4. For general discussion, see *Principles of Optics*, M. Born & E. Wolf, The MacMillan Company, New York 1964, pp. 401–404.

Figure 8:
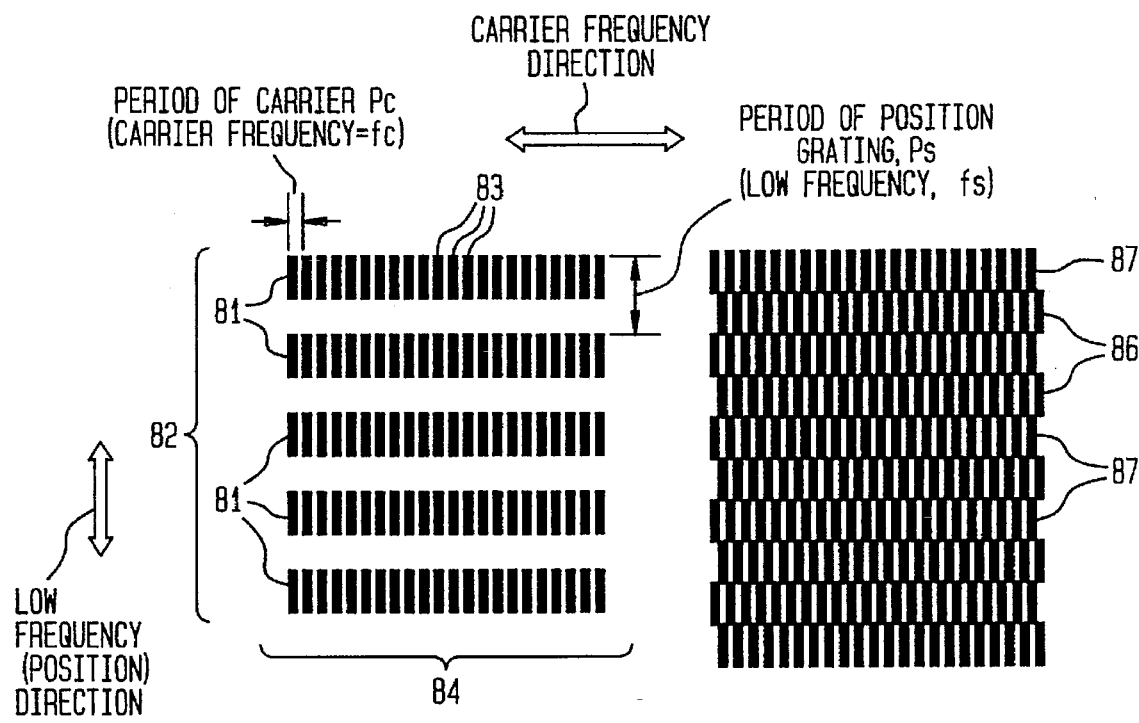
FIG. 8 shows two versions of mark gratings containing both position information and carrier information.

VIEW 8a of FIG. 8 shows the simple "crossed grating" 80, constituted of five grating lines 81, together forming the long period "signal" grating 82, of period $P_s$ (or frequency, $f_s = 1/P_s$). Long-period grating lines 81 are composed of short period grating lines 83 forming carrier gratings 84, of period, $P_c$ and frequency, $f_c$. Variation from the prototypical arrangement discussed (constant $P_s$ and $P_c$ may accomplish a number of purposes. By varying the pitch of the signal grating—by varying the line-to-line grating, the signal grating is effectively encoded, so that a particular value of composite field is obtained only with complimentary variation of the target grating. Varying pitch and phase in a single (or all) carrier grating may serve a similar purpose. By varying the (constant) pitch of adjacent carrier gratings, it is possible to bring their associated signal components to a confined region—e.g. for onto an optical fiber transmission system.

An alternate "zero-pi" grating 85 is shown in VIEW 8b. It is similar to grating 80 but includes additional carrier gratings 86 between long period grating lines 87. These additional carrier gratings 86 are 180° (i.e. pi radians) out of phase with carrier gratings forming the low-period grating lines 87. Zero-pi gratings make more effective use of illumination and form an image of twice the signal frequency. They may be substituted for simple gratings wherever shown or discussed.

Figure 9:
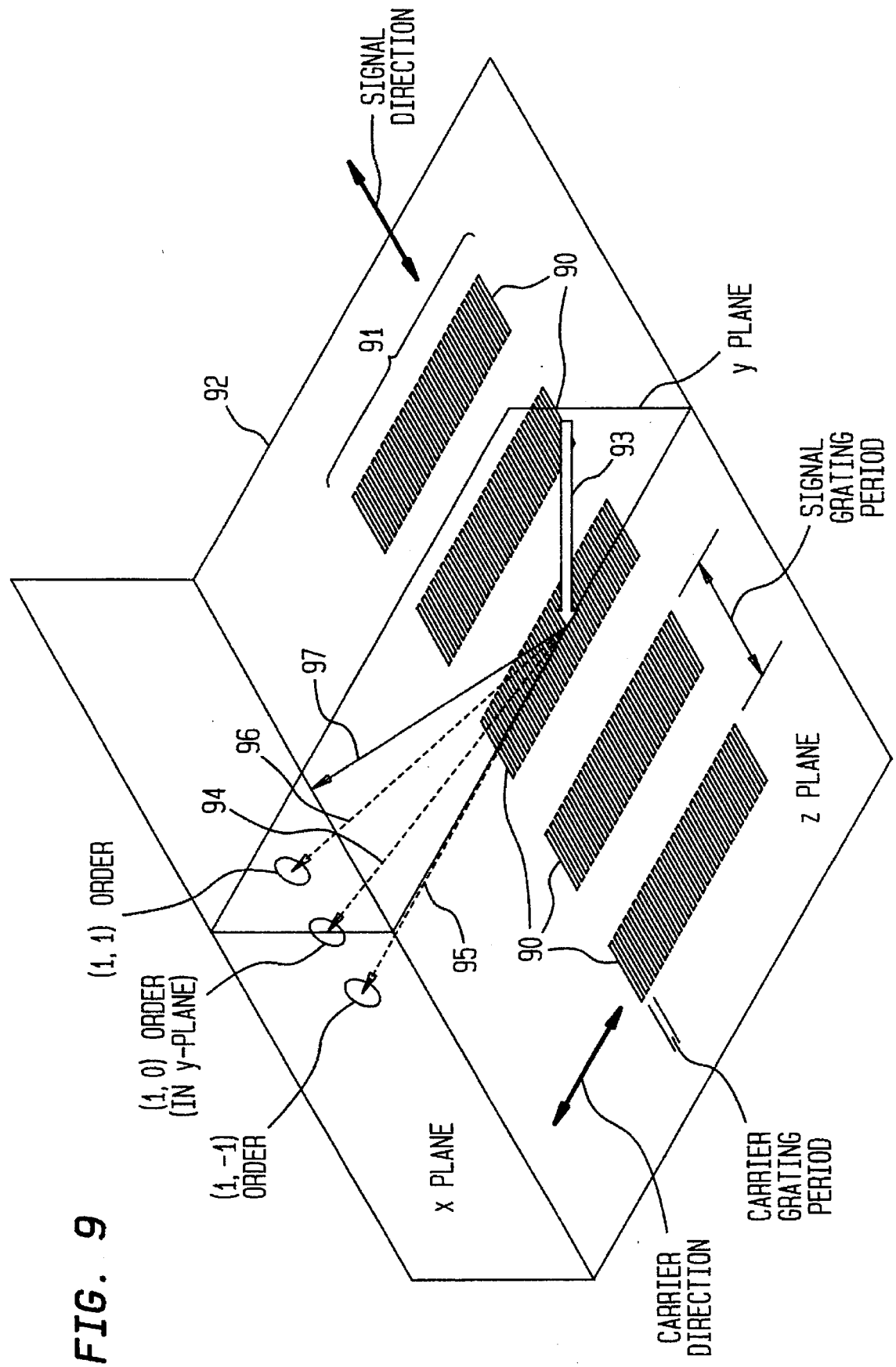
FIG. 9 is a diagrammatic view showing grating and diffraction orders for an illustrative signal-carrier system.

FIG. 9 is a detailed view showing the diffraction process at the target mark. The pattern shown is inherent both for reference marks and target marks (in fact including other modes and associated satellites for higher-order beams). In other figures, single routing paths may represent an entire set, or alternatively, a selected mode(s). The illustration is for a grating operating in reflection, which has been found to be a convenient arrangement for the target. As with other figures, all diffraction principles and are operative in either reflection or transmission. The figure shows a five-line signal grating 90 with lines constituted of carrier gratings 91. Grating 90 is on surface 92—imprinted or affixed. As shown, incident beam 93 strikes the grating, producing several diffracted beams. First order diffracted beam 94 (1,0) is the product of carrier gratings 91 alone. Satellite beams 95 (1,1) and 96 (1,–1) are diffracted simultaneously by the carrier and signal gratings. It is fundamental to the invention that specular beam 97, produced by simple reflection or transmission and transmitting major noise, is discarded. Ordinarily, one or both of the satellite modes is detected—its signal-to-noise ratio is better than that of the (1,0) mode.

In FIG. 10, the reference grating is shown as segmented. In principle, self registration is satisfied as well by a single constant phase reference grating in combination with a single segmented target grating. A segmented reference mark offers some convenience in information management—e.g. in offering collinear segment-by-segment reference beams for formation of the composite fields—and is generally preferred.

The figure shows a reference mark made up of a multiplicity of grating patterns interspersed in a checkerboard array. Position detection critically depends on comparison of the two segments and is intolerant of uneven illumination. The purpose of interleaving relatively small grating segments—small relative to illuminating beam cross section—is to average out non-uniformities in beam intensity.

Patterns in FIG. 10 consists of low-frequency gratings, all of period $P_s$, which for the preferred embodiment shown, are made up of grating lines constituting high-frequency carrier gratings. Four signal gratings 100 are shown. (In practice, segments would usually contain tens of grating lines.) Each signal grating consists of two segments 101 and 102. Signal grating segments, while of the same grating period, are out of phase with each other. In the example depicted, the gap spacing 103 between segments is alternately one-quarter and three-quarters of the signal grating period 104. By this means, the illustrative 90° phase mismatch is maintained in the same direction for successive gratings (exiting illumination is of the same phase for all of the "black squares" of the checkerboard) so that mismatch intensities add in each of the two directions. It is convenient to regard segments as shifted from a central, in-phase norm, so that segments are considered as either −45° or +45° for the example of 90° phase shift.

Carrier gratings differ for the two signal grating segments. Periods are designed to produce parallel (collinear) signal-carrying beams, with each pair containing one first-order diffracted beam from both segments.

In time multiplexing, segments 101 and 102 may be simultaneously illuminated by laser beams that alternate in time and strike at two distinct angles $\phi_{in+}$ and $\phi_{in-}$ since unwanted beams are rejected. (In FIG. 7, the corresponding beams 72 and 73 are directed by modulator 71.) Both alternating beams strike the entire reference pattern—both segments with equal averaged intensity.

The angles of the beams diffracted by the carrier gratings are as follows.

For angle of incidence $\phi_{in+}$:

$$\sin(\phi_{a\pm}) = \sin(\phi_{in+}) \pm \lambda/P_{c+} \qquad (2)$$

For angle of incidence $\phi_{in-}$:

$$\sin(\phi_{b\pm}) = \sin(\phi_{in-}) \pm \lambda/P_{c-} \qquad (3)$$

Accordingly, incoming beams of angles $\phi_{in+}$ and $\phi_{in-}$ create four separate first-order diffracted beams, $\phi_{a+}$, $\phi_{a-}$, $\phi_{b+}$, and $\phi_{b-}$. Input angles and grating periods 105, 106 are selected so that one of the two first-order beams diffracted from segments of carrier period 105 are collinear with one of the two first-order beams diffracted from segments of carrier period 106, e.g. so that $\phi_{a-} = \phi_{b-}$.

The collinear diffracted beams combine to produce a single reference beam which takes the same path to the signal target, and is then diffracted as a unitary composite beam. Identical paths assure identical diffraction efficiency, and other routing influences (such as reflectivity) are uniform. Since the alternation frequency may be substantial, e.g. 10 kHz, the system is kept from drifting. Long-term variations in the collinear beams are canceled out.

In a useful arrangement, only the two collinear beams, e.g. $\phi_{a-}$ and $\phi_{b-}$ are retained in the system. The zeroth order beam and other diffracted beams are removed by spatial filters that use apertures to select the desired carrier frequencies and angles of incidence. If aperturing at the reference mark is impractical, any extraneous beam can be filtered out further along the beam path.

As shown in FIG. 9, the crossed grating also creates two satellite modes with the main diffracted beam. Accordingly, $\phi_{a-}$ and $\phi_{b-}$ each represents three collinear beams.

FIG. 11 shows the principle of operation ("quadrature"). Four patterns are shown. In VIEW 11a, pattern 110 is a reference mark consisting of simple grating segments 111 and 112. Carrier gratings of the two segments may be of differing period to produce collinear first-order diffracted beams. In VIEW 11b, pattern 113 is the aerial image of mask grating 110. Extraneous beams have been stripped and do not participate in image reconstruction, so that the aerial image lines are solid. In VIEW 11c, target pattern 114 is of the same period as that of the aerial image, but is not segmented. It consists of eight equally-spaced grating lines. Since, in the usual embodiment, composite information is to be sensed by the same detector, carrier grating periods are equal—yielding uniform angle of emergence for composite beams produced by both collinear beams. (There is no required relationship between the carrier frequencies of the target and reference marks—they are independently determined to deliver desired paths.)

In VIEW 11d, composite pattern 115 shows the target pattern 114 with superimposed aerial image 113. As depicted, the composite mark represents alignment for the usual null, rather than gray-scale, system. Aerial images of the +45° segment and of the −45° segment overlap halves of the target pattern by an equal amount. If the target moves out of alignment, the diffraction powers of the two exiting beams will differ. (If the target moves up, the power from the +45° segment will increase.)

Since, in time multiplexing, the two segments are sensed alternately, the photodetector output is seen as an alternating change in photo-current. By demultiplexing—by separately measuring the two current components, $I_{+45}$ and $I_{-45}$—both alignment and direction of misalignment may be determined. The amount of misalignment is the absolute value of the difference between the two currents—the direction of misalignment is the sign of the difference. This may be expressed as the function, R:

$$R = \frac{I_{+45} - I_{-45}}{I_{+45} + I_{-45}} \qquad (3)$$

The R function is self normalizing, i.e. changes in laser power do not change the value of R. R equals zero at alignment (defines a coordinate origin). Otherwise, the sign and magnitude of the finite value characterizes the misalignment. The R function has proved to be very robust under many conditions in both computer simulations and in experimental tests. R functions analogous to that of Eq. 3 may be derived for 3-phase and more complex signals.

The beams diffracted from the target contain a central first-order beam (1,0) plus two or more sidebands, similar to the (1,−1) and (1,+1) modes shown in FIG. 9. These sidebands also contain composite field information, and it is usually preferred to use these modes rather than the central mode. The two satellite modes are not perpendicular to the target, so that the apparent position varies if not in focus. By adding the R functions of the two satellite modes, any differences average out, i.e., $R = (R_{+1} + R_{-1})/2$, so that if both sidebands are used, exact focus is not required. In addition, since the R functions for the satellites vary with z-direction, the difference $R_{+1} - R_{-1}$, can be used to measure extent of defocus, or z-position.

When using a zero-pi reference mark, there is no zero order (1,0) diffracted beam, and the satellite modes are caused by symmetrical input radiation. The advantage is positional information independent of defocus. The disadvantage is unavailability of z-position information.

The quadrature principle applies unchanged to an embodiment in which segmented marks contains more than two segments. The small loss in position-dependent slope of intensity is offset by more uniform sensitivity to position adjustment. A two-segment mark provides accurate position information for about three-quarters of a period, but the slope of the R function is small, and approaches zero in regions of the remaining quarter. Using a three-segment mark, with the three segments, respectively, +60°, 180° and −60° out of phase with the target grating, and with a time-multiplexed beam divided into three collinear beams, three R functions are defined. By using individual R functions successively, so that regions of zero slope are successively ignored, accuracy is maintained over target displacement of the entire period.

Discussion has been largely in terms of single paired reference-target marks. A second pair orthogonal to the first permits x-y sensing. Since the R function is cyclical, identification of the specific cycle requires an auxiliary measurement. This uncertainty of some factor of $P_s$ is remedied by a coarse alignment to locate the target within a specific cycle—preferably to 0.75 $P_s$ or better. Alternatively, the range of certainty may be improved by use of separate and independent mark pairs of different signal periods, with alignment requiring R=0 in both.

The preferred embodiment, providing carrier as well as positioning information, is generally described as taking the form of a fundamental positioning grating with grating lines made up of higher frequency gratings which constitute the secondary (or carrier) gratings, and discussion is generally in terms of this arrangement. Alternatives include fundamental gratings with lines constituted of gratings of longer period than that of the fundamental grating. Further, the gratings may be transposed so that the fundamental grating is used for routing the position information of the secondary grating.

It is natural to project the reference mark on the target mark, and discussion has been in these terms. Depending on equipment design or other circumstances, it may be convenient to reverse the process—to form the composite field from a projected target mark. The considerations are identical.

Imaging generally contemplates focusing element(s), and use of conventional central-symmetric lenses—either transmission or reflection—is contemplated. In instances where positioning makes use only of one or more sets of either x- or y-gratings, lenses may be replaced by prisms or mirrors.

The invention is applicable to an alternate form of pattern delineation. In "proximity" printing, a 1:1 image uses a reticle end wafer in near-contact (with spacing only to prevent damage). Darkfield imaging, using beams routed by carrier gratings, continues to improve signal-to-noise ratio. It is most useful for the composite beam. A likely embodiment provides for reflection of the diffracted composite beam off the incident surface of the wafer, so that it again passes through the reticle and thence to the detector. A contemplated embodiment provides for the reflected beam passing through a dedicated (clear) region of the reticle to avoid the complexity of secondary diffraction.

What is claimed is:

1. Process comprising position-sensing a target body relative to a reference body, in which a first mark on a first body is illuminated to produce an image beam for projecting an image of the first mark on the second body, and in which relative position is determined by comparing the projected image of the first mark with a conjugate mark on the second body on the basis of light emerging from the conjugate mark, In which each mark includes a grating here designated "signal grating", in that at least one of the signal gratings is segmented so that segments are out-of-phase with each other, in that the grating periods of the second mark and of the projected image of the first mark are harmonically related, in which the projected image of the first mark is superimposed on the second mark with signal gratings parallel, and in which position-sensing includes detection of the relative degree of overlap for the segments,

CHARACTERIZED IN THAT at least one signal grating is combined with a carrier grating to form a combined grating, in that the carrier grating diffracts emerging light, and in that position-sensing is based on diffracted light rather than light following specular routing, whereby noise due to imperfections in specular path is lessened, so resulting in improved signal-to-noise ratio.

2. Process of claim 1 in which the first mark is on the reference body, the grating periods of the second mark and of the projected image of the first mark are equal and the conjugate mark includes a combined grating.

3. Process of claim 2 in which the signal grating on the reference body is segmented.

4. Process of claim 3 in which a beam, formed by superimposing the image of the first mark on the second mark, here designated "composite beam", is directed to a detector, and specular path light emerging from the target mark is outside the reception area of the detector.

5. Process of claim 4 in which a combined grating consists essentially of a signal grating formed of grating lines constituted of carrier gratings.

6. Process of claim 5 in which carrier grating periods are shorter than signal grating periods.

7. Process of claim 2 in which the first mark is illuminated by multiple illumination beams of differing angle of incidence on the first mark, individual illumination beams yielding segment-related information for different segments.

8. Process of claim 7 in which multiple illuminating beams are produced by a single light source.

9. Process of claim 8 entailing time-multiplexing, in which the single-light source is modulated so as to produce multiple illuminating beams sequentially.

10. Process of claim 9 in which the source is modulated by an acousto-optic deflector.

11. Process of claim 10 in which a single detector is used for detection.

12. Process of claim 1 in which the target is positioned in response to position-sensing so as to equalize the overlap for each of the two segments, any divergence from equality constituting an "error signal".

13. Process of claim 12, in which the first mark is on the reference body and the grating periods of the second mark and of the projected image of the first mark are equal, the process entailing time-multiplexing, in which position-sensing information for the two segments is sensed sequentially, in which the error signal is sensed as the output of a single photodetector.

14. Process of claim 1 in which the two segments are out of phase by at least 10°.

15. Process of claim 14 in which the segments are out of phase by approximately 90°.

16. Process of claim 1 in which a grating contains three segments.

17. Process of claim 16 in which the segments are out of phase by approximately 120°.

18. Process of claim 1 comprising a machining operation.

19. Process of claim 1 in which marks are directly printed.

20. Process of claim 1 in which a mark includes more than one signal grating.

21. Process of claim 20 in which a mark includes orthogonal signal gratings.

22. Process of claim 20 in which a mark includes signal gratings of differing periods, and in which position-sensing is sensitive to distances in excess of a signal grating period.

23. Process of claim 20 in which a mark includes multiple interleaved signal gratings and carrier gratings, whereby spatial non-uniformity of illuminating light is averaged.

24. Process of claim 1 in which the carrier periods of the carrier gratings differ, in which the carrier gratings, upon illumination, yield a pair of collinear first-order diffracted alignment subbeams, the pair constituting a subbeam from each of the two segments.

25. Process of claim 1 constituting proximity delineation in which the two bodies are in near contact.

26. Process of claim 4 in which the composite beam comprises a satellite beam.

27. Process of claim 26 in which satellite beams relating to the separate segments are independently detected, and in which an R function is calculated to derive further position information, in which R is defined as the difference between the intensities of the two detected signals divided by the sum of the intensities of the two detected signals.

28. Process of claim 26 in which further position information includes z information.

29. Process of claim 1 in which the combined grating is a zero-pi grating, in which signal grating lines are constituted of first carrier gratings and in which second carrier gratings occupy spaces between signal lines, in which first and second carrier gratings are of equal period but are out-of-phase by 180°.

* * * * *